Jan. 21, 1969 G. W. FESTER 3,422,876
VEHICLE WINDOW SCREEN
Filed Oct. 27, 1966 Sheet 1 of 2

Guenther W. Fester
INVENTOR.

BY Clarence A. O'Brien
and Harvey B. Jackson
Attorneys

Jan. 21, 1969
G. W. FESTER
3,422,876
VEHICLE WINDOW SCREEN
Filed Oct. 27, 1966
Sheet 2 of 2
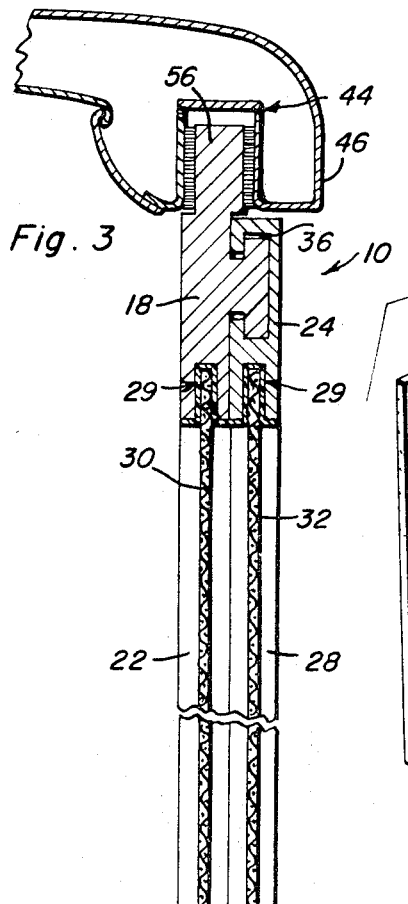
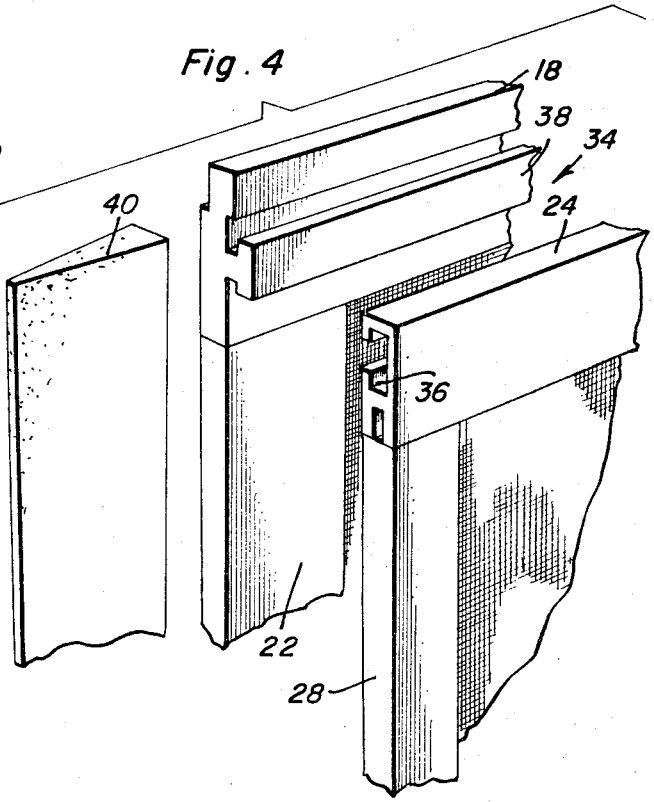
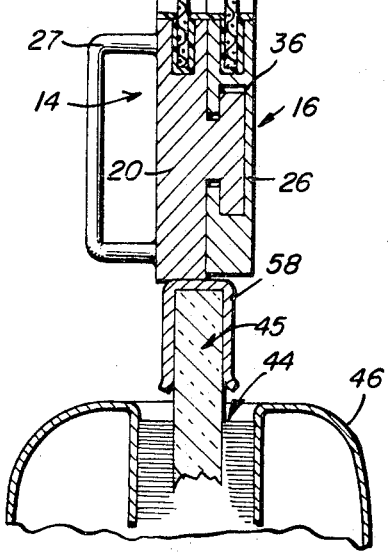
Guenther W. Fester
INVENTOR.
BY Clarence A. O'Brien
and Harvey B. Jacobson
Attorneys

United States Patent Office 3,422,876
Patented Jan. 21, 1969

3,422,876
VEHICLE WINDOW SCREEN
Guenther W. Fester, Rte. 3, Highway 141 S.,
Sheboygan, Wis. 53081
Filed Oct. 27, 1966, Ser. No. 589,958
U.S. Cl. 160—40                    5 Claims
Int. Cl. B60j 1/16; E06b 9/00

ABSTRACT OF THE DISCLOSURE

A removable screen assembly for mounting in an automobile window opening and including slidably engaged frame portions to permit a utilization of the screen assembly in automobile window openings of varying widths. The lateral edge of at least one of the frame portions is provided with a coextending laterally projecting resilient seal member, of truncated triangular configuration, which is engageable with the body of the automobile adjacent the window opening, in overlying sealing relation to the exterior surface of the automobile adjacent the window opening whereby the seal member compensates for window openings having a non-vertically disposed rear edge portion.

---

The present invention relates to vehicles window screens and more particularly to vehicle window screen particularly adapted to be utilized universally in conjunction with vehicle windows of various configurations and dimensions. Numerous constructions for vehicle window screens have been proposed heretofore to permit a vehicle to be driven with one or more of the windows open during warm seasons without permitting insects and the like to enter the passenger compartment. However, many of such screens are only suitable for utilization with a specific model of vehicle or at best only relatively few models thus necessitating the manufacture of a relatively great number of screens of varying sizes and configurations.

It is therefore a primary object of the present invention to provide a novel construction for a vehicle window screen which overcomes many of the disadvantages inherent in vehicular window screens proposed heretofore inasmuch as the screen of the present invention may be utilized in conjunction with a greater number of vehicles than generally possible with vehicle window screens proposed heretofore.

Another object of the present invention is to provide a novel vehicle window screen which in addition to being adjustable laterally is also provided with a seal means adapted to facilitate sealing the screen frame to vehicle window frames having somewhat irregular contours.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical cross-sectional view of the vehicle screen of FIGURE 1 taken substantially along the plane of the line 3—3 of FIGURE 2;

FIGURE 4 is a fragmentary, partially exploded perspective of the upper left hand corner portions of the two frame members of the vehicle screen of FIGURE 1 and an associated seal member;

FIGURE 5 illustrates a modified means of securing the seal member to the outer edge of the frame members.

Figure 1:
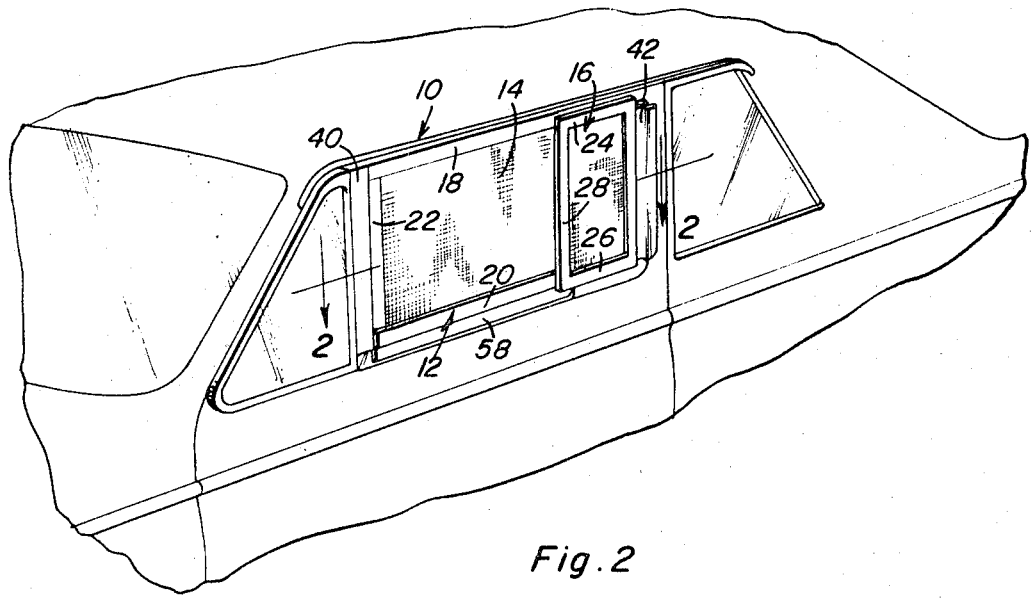
FIGURE 1 is a fragmentary perspective view of a vehicle showing an exemplary embodiment of a vehicle window screen constructed in accordance with the principles of the present invention and further showing the screen operatively positioned within the window of a vehicle.
Figure 2:
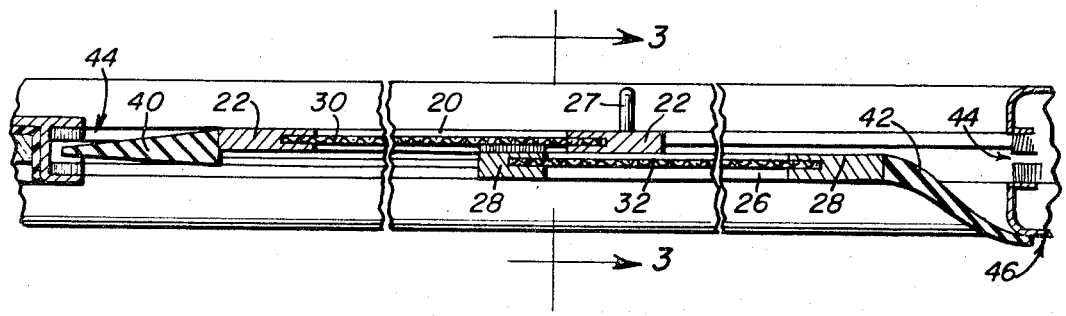
FIGURE 2 is an enlarged horizontal cross-sectional view of the vehicle window screen of FIGURE 1 taken substantially along the plane of the line 2—2 of FIGURE 1.

Referring now to the drawings it will be seen that the removable vehicle window screen indicated generally at 10 includes a longitudinally adjustable frame means 12 including generally rectangular frame portions indicated generally at 14 and 16. The removable vehicle window screen 10, as will become clear hereinafter, is of slightly lesser dimensions than the vehicle window opening within which it is to be operatively placed. The frame portion 14 comprises integral upper, lower and side frame members 18, 20 and 22 respectively. The frame portion 16 comprises integral upper, lower, and side frame members 24, 26 and 28 respectively.

The frame portions 16 and 18 and more specifically the inwardly disposed surfaces of each of the frame members 18–28 are provided with a screen panel receiving means or recess indicated generally at 29 within which inner peripheral recesses are secured screen panels 30 and 32, respectively. The screen panels 30 and 32 are formed of course that it is possible to integrally form the frame are secured within the recesses 29 with a fastening means such as adhesive, staples, etc., for example.

The frame members 16–28 are preferably formed of extruded, molded, or stamped resinous material, such as nylon, for example, which frame members are secured such as by means of autogenous welding, adhesive, mechanical fasteners to form the respective generally rectangular frame portions 14 and 16. It will be understood of course that it is possible to integrally form the frame portions 14 and 16 without utilizing a plurality of frame members such as the frame members 18–28 although such a procedure does somewhat complicate the insertion of screen panels 30 and 32.

As seen best in FIGURES 3 and 4 the frame portions 14 and 16 are slidably connected by provisions of a slidable connection means indicated generally at 34 which in the embodiment 10 illustrated comprises a mortise and tenon-joint including a mortise indicated at 36 provided in the upper 24 and lower 26 frame members of the frame portions 16 which mortises 36 are slidably received about a pair of tenons 38 of complementary cross-sectional configuration. The tenons 38 are integral with the upper 18 and lower 20 frame members of the frame portion 14. In the embodiment 10 illustrated, the mortises 36 and tenons 38 are of a generally T-shaped cross-sectional configuration although it will be understood that this is merely exemplary and that any suitable cross-sectional configuration that permits longitudinal sliding interengagement of the frame portions 14 and 16 would be satisfactory.

Referring now to FIGURES 2, 4–6, it will be seen that the outwardly disposed side members 22 and 28 of the frame portions 14 and 16 are provided with longitudinally projecting and coextensive resilient seal members 40 and 42 adapted to selectively engage the vehicle window channel indicated at 44 or alternately the window frame 46 adjacent the window opening of the vehicle. The resilient members 40 and 42, preferably formed of a material such as a synthetic relatively solid rubber or non-communicating cellular foam rubber may be secured to their associated side frame members 22 and 28 such as by means of an adhesive as will be understood in FIGURES 1, 2 and 4.

Figure 6:
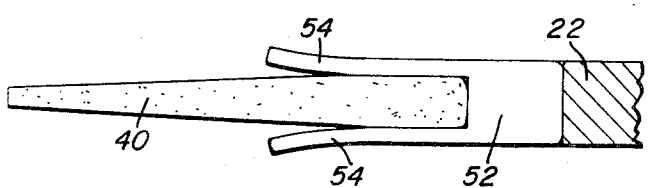
FIGURE 6 illustrates a further modification of the seal securing means illustrated in FIGURE 5.

Alternatively, as seen in FIGURES 5 and 6 the resilient seal member 40 secured to the side frame member 22 by means of a plurality of pairs of compression plates 48 received in a slot comprising an extension of the adjacent screen receiving slot 29 which seal 40 is clampingly secured therein by means of a through bolt 50 received in suitable apertures provided in the several lamina. In addition, as may be seen in FIGURE 6 the resilient seal member 40 may be frictionally retained in by means of open channel clamp means 52 having opposed inwardly biased resilient clamping fingers 54 within which is frictionally retained the resilient seal member 40. Although not shown, it will be appreciated that the clamp 52 is secured to its associated side frame member 22 or 28 by means of a suitable fastener such as adhesive, screws, rivets, etc.

As seen best in FIGURE 3 the removable vehicle window screen 10 and preferably the generally rectangular frame portion 14 is removably retained in the operated position shown in FIGURE 1 by virtue of the fact that the top portion 56 of the upper frame member 18 is sized so as to be received within the channel 44, which normally receives the peripheral edge of the vehicle window glass 45. The lower frame member 20 of the frame portion 14 is removably retained on the partially retracted window glass 45 by means of a downwardly opening elongated clip 58 extending substantially along the entire length of the lower frame member 20 and secured thereto by suitable fastener means such as adhesive, screws, bolts, etc. It will further be appreciated that the elongated clip 58 may if desired be integrally formed with the lower frame member 20.

Referring now to the utilization of the removable vehicle window screen 10 the screen is operatively positioned by partially retracting the window glass 45 and then inserting the portion 56 of the frame portion 18 within the upper glass receiving channel 44, with the screen 10 retained in a generally vertical position whereby the downwardly opening clip 58 is aligned with the glass 45. The window operator (not shown) is actuated to raise the window glass 45 to the position shown in FIGURE 3 wherein the glass 45 is received within the clip 58 of frame portion 14 thus retaining the screen 10 between the window glass 45 and the upper portion of the window frame 46. As seen best in FIGURES 1 and 2 the frame portion 14 is preferably set in the aforementioned manner with the resilient seal member 40 engaged within the forward vertical portion of the channel 44. The frame portion 16 is then slidably advanced until its associated resilient seal member 42 sealingly engages its associated vertical window channel 44 or overlaps and sealingly engages the outer window frame portion 46. The removal of the screen is of course accomplished by reversing the aforementioned procedure.

From the foregoing, it will be apparent that the removable vehicle screen 10 of the present invention is characterized by a number of advantages over vehicle window screens proposed heretofore particularly in that the provision of a longitudinal sealing means, such as the resilient seals 40 and 42, facilitates utilization of the vehicle window screen 10 of the present invention in conjunction with vehicle window openings of varying dimensions and configurations by providing a "universally" sized screen. In addition, it will also be appreciated that the seal members 40 and 42 compensate for slight irregularities in the vehicle window frame so as to substantially preclude the entrance of insects and the like into the passenger compartment during utilization of the device of this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. In this regard, the removable vehicle screen 10 may be modified by the addition of a handle 27 rigidly secured to or integral with the frame member 20 as seen best in FIGURE 3. Thus it will be seen that the handle 27 normally projects into the passenger compartment of the vehicle so as to facilitate insertion and removal of the screen 10 from the car window.

What is claimed as new is as follows:

1. A removable screen assembly for mounting in an automobile window opening comprising an adjustable frame means including first and second adjustably and slidably interengaged frame portions each having a peripheral frame comprised of upper, lower and side members supporting screen panels therebetween, said frame portions being adjustably and slidably interengaged by complementary T-shaped tenons and mortises integral with the juxtaposed portions of said upper and lower frame members, said first frame portion being substantially longer than said second frame portion, a longitudinally extending upstanding tab of the same thickness as the window glass of the automobile window within which the screen assembly is to be mounted, said tab being carried by the upper frame member of said first frame portion, said lower frame member of said first frame portion being provided with a longitudinally extending downwardly opening U-shaped resilient clip sized to embracingly engage the upper edge surfaces of the window glass of the automobile window within which the screen assembly is to be mounted, the outwardly disposed side edge portions of said side frame members of said first and second frame portions each being provided with a coextending laterally projecting resilient seal member of truncated triangular configuration, and said resilient seal member of said second frame portion being engageable in overlying sealing relation to the exterior surface of the automobile adjacent the window opening of the automobile window within which the screen assembly is to be mounted.

2. The combination of claim 1 wherein said seal members are adhesively secured to the side members of said frame portions.

3. The combination of claim 1 wherein said seal members are secured to said side members by a resilient clip means.

4. The combination of claim 1 wherein said seal members are secured to said side members by positive fasteners which pass through said side members and said seal member.

5. The combination of claim 1 including a handle means integral with said frame means, said handle means being positioned so as to normally project within the passenger compartment of the vehicle.

References Cited

UNITED STATES PATENTS

| 1,608,785 | 11/1926 | Evans | 160—40 |
| 1,722,854 | 7/1929 | Mosbacher | 160—40 |
| 2,263,813 | 11/1941 | Mason | 160—40 |
| 2,612,947 | 10/1952 | Jenks | 160—40 |
| 2,869,634 | 1/1959 | Bourgoin | 160—40 |

FOREIGN PATENTS 294,941   4/1965   Netherlands.

DAVID J. WILLIAMOWSKY, *Primary Examiner.*

J. KARL BELL, *Assistant Examiner.*

U.S. Cl. X.R.

160—90